US012591496B2

(12) United States Patent　　　(10) Patent No.:　US 12,591,496 B2
Huo et al.　　　(45) Date of Patent:　Mar. 31, 2026

(54) HOST SYSTEM DIAGNOSTIC TESTING

(71) Applicant: Micron Technology, Inc., Boise, ID (US)

(72) Inventors: Binbin Huo, Taufkirchen (DE); Olivier Duval, Hudson, NH (US)

(73) Assignee: Micron Technology, Inc., Boise, ID (US)

( * ) Notice: Subject to any disclaimer, the term of this patent is extended or adjusted under 35 U.S.C. 154(b) by 1 day.

(21) Appl. No.: 18/467,267

(22) Filed: Sep. 14, 2023

(65) Prior Publication Data

US 2025/0094303 A1　Mar. 20, 2025

(51) Int. Cl.
G06F 11/30　(2006.01)
G06F 11/34　(2006.01)
G06F 13/16　(2006.01)
(52) U.S. Cl.
CPC ...... G06F 11/3037 (2013.01); G06F 11/3466 (2013.01); G06F 13/1673 (2013.01)
(58) Field of Classification Search
CPC ............. G06F 11/3037; G06F 11/3466; G06F 13/1673
See application file for complete search history.

(56) References Cited

U.S. PATENT DOCUMENTS

| | | | | |
|---|---|---|---|---|
| 8,250,408 | B1 * | 8/2012 | Cohen ................... | G06F 11/079 |
| | | | | 714/48 |
| 2007/0225943 | A1 * | 9/2007 | Marano ............... | G06F 11/3636 |
| | | | | 702/182 |

| | | | | |
|---|---|---|---|---|
| 2015/0121337 | A1 * | 4/2015 | Makarov ............. | G06F 11/3466 |
| | | | | 717/115 |
| 2017/0135587 | A1 * | 5/2017 | Desroches ............... | A61B 5/01 |
| 2019/0243749 | A1 * | 8/2019 | Rutten .................. | G06F 16/217 |
| 2020/0373942 | A1 * | 11/2020 | Wang .................... | H04L 1/0065 |
| 2021/0210151 | A1 * | 7/2021 | Pawlowski ......... | G06F 13/1668 |
| 2022/0083442 | A1 * | 3/2022 | Hanham ............. | G06F 11/3656 |
| 2022/0237160 | A1 * | 7/2022 | Wang ................. | G06F 16/2365 |

FOREIGN PATENT DOCUMENTS

CN　　　　110609537 A　* 12/2019　......... G05B 23/0221

* cited by examiner

*Primary Examiner* — Mark D Featherstone
*Assistant Examiner* — Jeffrey Andrew Yang
(74) *Attorney, Agent, or Firm* — Holland & Hart LLP

(57)　　　　　ABSTRACT

Methods, systems, and devices for host system diagnostic testing are described. A diagnostic tool including a diagnostic executable stored to an external memory may evaluate a system including a host subsystem and a memory subsystem. Upon initialization, the diagnostic executable may configure trace points in one or more layers (e.g., associated with an operating system) of the host subsystem based on dependencies (e.g., libraries) stored to the external memory, and may receive, from the host subsystem, first data collected at the trace points, directly from a host system buffer, or from the memory subsystem. Concurrent to the collection procedure, the diagnostic executable may perform processing operations on the first data to generate second data, which may be associated with one or more metrics of system performance. The second data is stored to the external memory, and may be utilized to evaluate the system.

20 Claims, 5 Drawing Sheets

Diagnostic Initialization
Component

425

Configuration Component

430

Data Reception Component

435

Data Processing Component

440

Storage Component

445

420

400

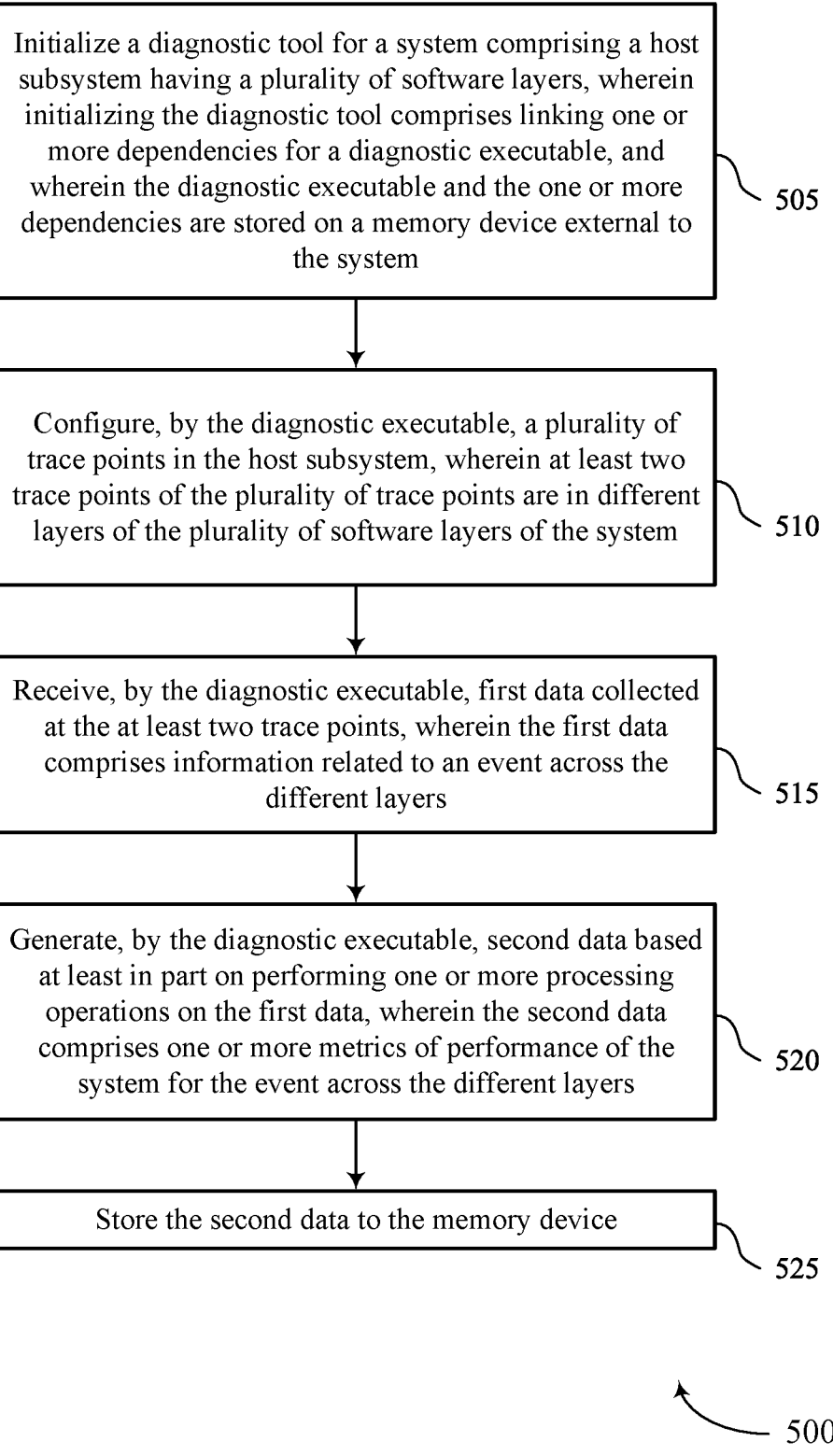

Initialize a diagnostic tool for a system comprising a host subsystem having a plurality of software layers, wherein initializing the diagnostic tool comprises linking one or more dependencies for a diagnostic executable, and wherein the diagnostic executable and the one or more dependencies are stored on a memory device external to the system

505

Configure, by the diagnostic executable, a plurality of trace points in the host subsystem, wherein at least two trace points of the plurality of trace points are in different layers of the plurality of software layers of the system

510

Receive, by the diagnostic executable, first data collected at the at least two trace points, wherein the first data comprises information related to an event across the different layers

515

Generate, by the diagnostic executable, second data based at least in part on performing one or more processing operations on the first data, wherein the second data comprises one or more metrics of performance of the system for the event across the different layers

520

Store the second data to the memory device

HOST SYSTEM DIAGNOSTIC TESTING

CROSS REFERENCE

The present Application for Patent claims priority to U.S. Patent Application No. 63/407,045 by Huo et al., entitled "HOST SYSTEM DIAGNOSTIC TESTING," filed Sep. 15, 2022, which is assigned to the assignee hereof, and which is expressly incorporated by reference herein.

FIELD OF TECHNOLOGY

The following relates to one or more systems for memory, including host system diagnostic testing.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

BRIEF DESCRIPTION OF THE DRAWINGS

FIG. 5 shows a flowchart illustrating a method or methods that support host system diagnostic testing in accordance with examples as disclosed herein.

DETAILED DESCRIPTION

In some examples, a diagnostic tool (e.g., a field-deployed diagnostic tool) may evaluate a system (e.g., a stand-alone system) in accordance with one or more metrics of system performance, where the system may include a host subsystem. For example, the diagnostic tool may collect data related to an event (e.g., to track an event, associated with an application of the host subsystem) at one or more preconfigured trace points in layers of an operating system implemented by the host subsystem. Following the diagnostic tool operations, the data may be processed (e.g., in accordance with one or more post-processing operations) to generate the one or more metrics of system performance. However, such diagnostic tools may have limited applicability due to the amount of data collected (e.g., generated) during testing. Furthermore, diagnostic tools may provide limited system platform support due to different configurations of systems (e.g., in accordance with different operating systems), where a diagnostic tool may only be compatible with a small subset of system platforms. Accordingly, improved diagnostic testing may be desired.

In accordance with techniques as disclosed herein, a diagnostic tool may be operable to evaluate a system, where the diagnostic tool may configure one or more trace points in the system to generate data and perform processing operations on the data during diagnostic testing. For example, a diagnostic tool including a diagnostic executable stored to an external memory may evaluate a system including a host subsystem and a memory subsystem. Upon initialization, the diagnostic executable may configure trace points in one or more layers (e.g., associated with an operating system) of the host subsystem based on dependencies (e.g., libraries, user libraries) stored to the external memory, and may receive, from the host subsystem, first data collected at the trace points. In some cases, the first data may also be retrieved from an internal log of one or more system components such as the memory subsystem, or from a buffer of the host subsystem (e.g., buffer data associated with one or more events).

Concurrent to the collection procedure, the diagnostic executable may perform (e.g., continuously perform) processing operations on the first data to generate second data, where second data may be associated with one or more metrics of system performance and may have a smaller storage size than the first data. The second data is stored to the external memory, and may be utilized to evaluate the system. Because the diagnostic tool is operable to configure trace points based on dependencies stored to the external memory, the diagnostic tool may support multi-platform testing as the diagnostic tool includes dependencies applicable to different system platforms. Additionally, the diagnostic tool may perform processing operations to reduce the size of raw data collected during the evaluating, improving storage efficiencies.

Figure 1:
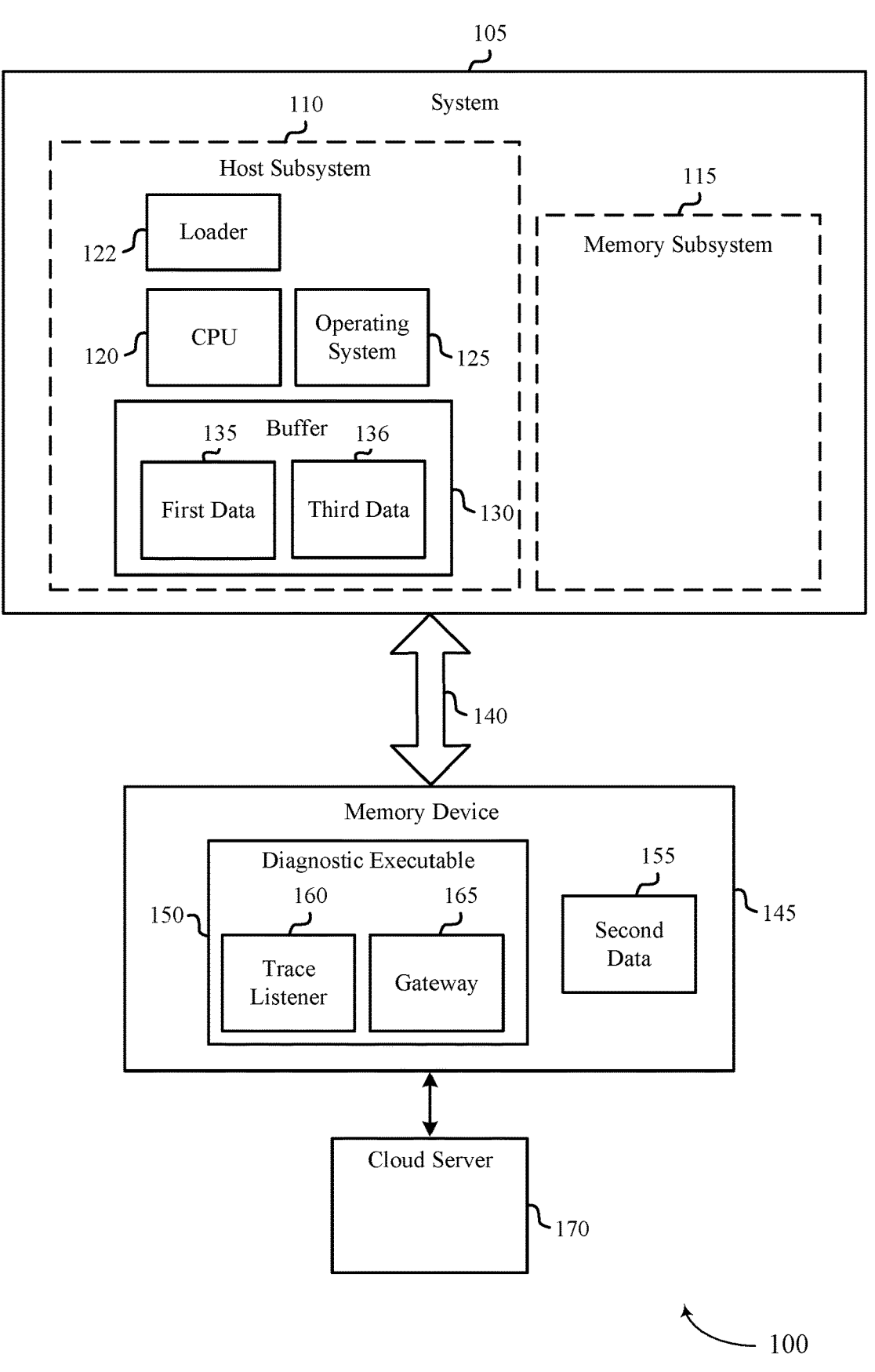
FIG. 1 illustrates an example of a diagnostic testing environment that supports host system diagnostic testing in accordance with examples as disclosed herein.
Figure 2:
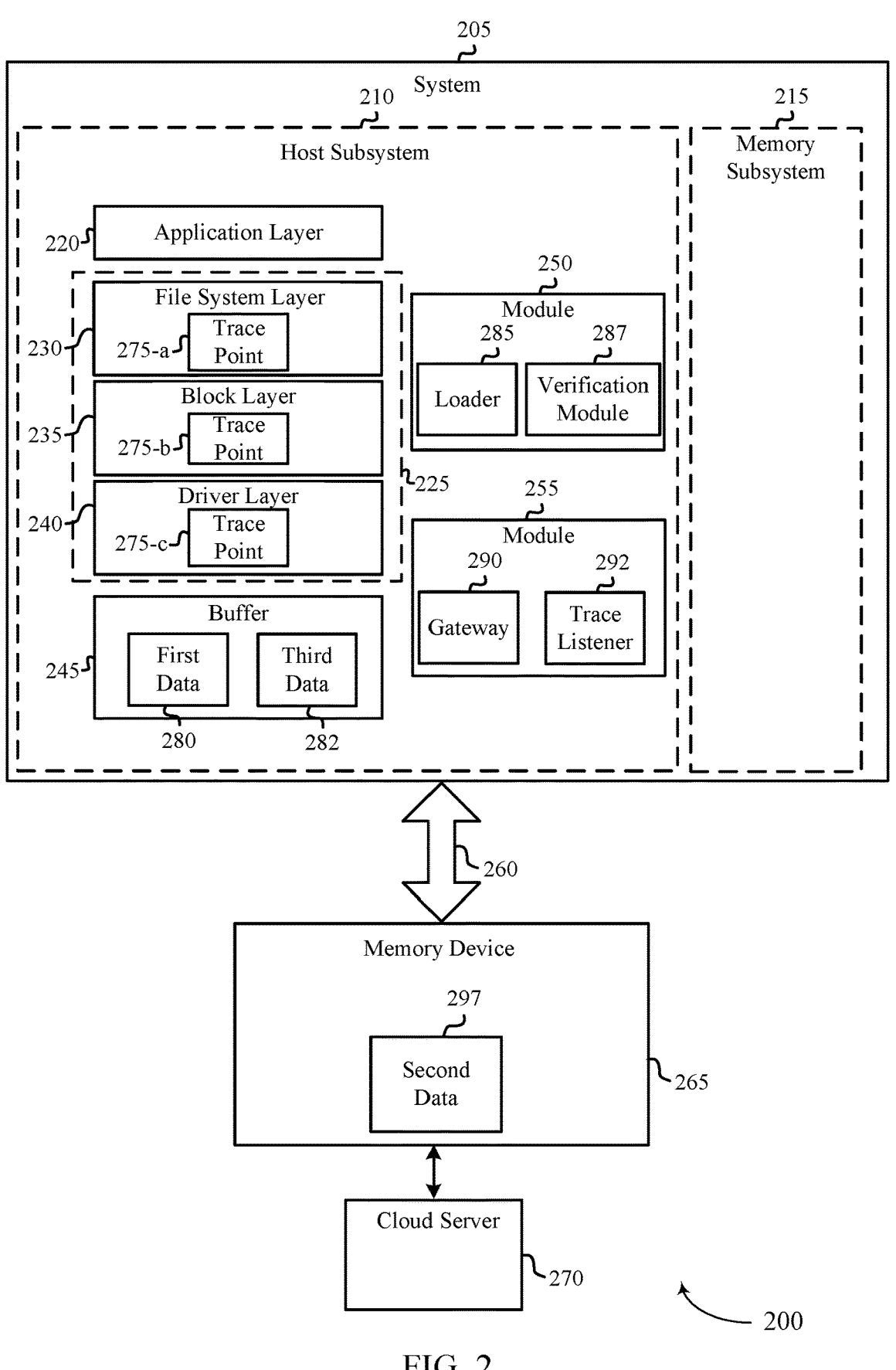
FIG. 2 illustrates an example of a diagnostic testing environment that supports host system diagnostic testing in accordance with examples as disclosed herein.
Figure 3:
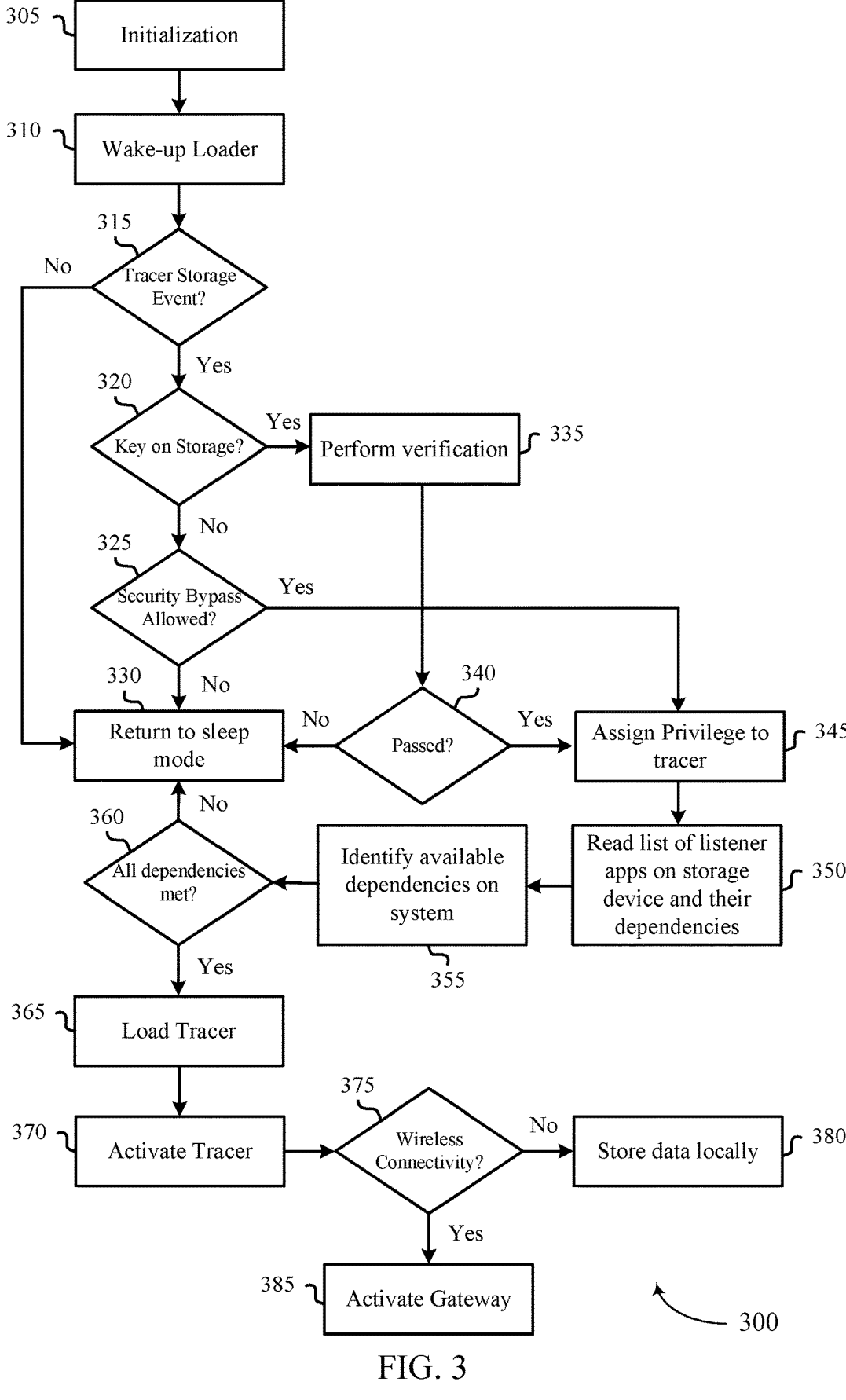
FIG. 3 illustrates an example of a process flow that supports host system diagnostic testing in accordance with examples as disclosed herein.

Features of the disclosure are described in the context of diagnostic testing environments and a process flow with reference to FIGS. 1 through 3. These and other features of the disclosure are further illustrated by and described in the context of apparatus diagrams and flowcharts that relate to host system diagnostic testing with reference to FIGS. 4 through 7.

FIG. 1 illustrates an example of a diagnostic testing environment 100 that supports host system diagnostic testing in accordance with examples as disclosed herein. The diagnostic testing environment 100 may include a system 105, a memory device 145, and a cloud server 170. In some examples, diagnostic testing may be performed on the system 105 in accordance with a diagnostic executable 150 associated with a diagnostic tool and stored to the memory device 145. In such examples, the diagnostic tool may be configured to be perform diagnostic testing on different system platforms, and may have improved data storage efficiencies, where the diagnostic tool may process collected raw data during diagnostic testing. Accordingly, the diagnostic tool as described herein may be generally applicable to system platforms (e.g., associated with different operating systems, different versions of an operating system) and may have improved general performance.

The system 105 may include a host subsystem 110 and a memory subsystem 115, and the host subsystem 110 may include a central processing unit (CPU) 120, an operating system 125, and a buffer 130. The host subsystem 110 may also include a loader 122, which may perform one or more of detection of the presence of memory device 145, mounting of memory device 145 for host subsystem 110, loading of diagnostic executable 150 from memory device 145, verifying diagnostic executable 150, or triggering execution of diagnostic executable 150 after verification. The CPU may be operable to execute instructions for operation of the system 105. The operating system 125 may serve as a user interface for the system 105 (e.g., between a user and hardware of the system 105), and may include one or more layers (e.g., application layer, file system layer, for example) to facilitate interactions between a user and hardware of the system 105. The operating system 125 may follow one or more configurations, where the system platform (e.g., type of operating system) or a version of the system platform of the operating system 125 may be different. In such examples, the operating system 125 may include or be otherwise associated with different dependencies (e.g., libraries, user libraries, packages) in accordance with different configurations. The dependencies may be relevant to operation and structure of the operating system 125. The buffer may be an example of random-access memory (RAM) and may serve as storage (e.g., temporary storage) to facilitate operations of the host subsystem 110.

The memory subsystem 115 may include either or both of volatile memory storage and non-volatile memory storage configured to store data from the host subsystem 110. The memory subsystem 115 may include additional components configured to facilitate access operations to memory storage and to interface with the host subsystem.

The memory device 145 (e.g., an external memory device, a non-volatile storage device) may be external to the system 105, and may be an example of a universal serial bus (USB) stick or other such portable storage device. The memory device 145 may include a diagnostic executable 150, where the diagnostic executable includes a trace listener 160 and a gateway 165. The diagnostic executable 150 may be an example of or otherwise associated with a diagnostic tool for performing diagnostic tests on the system 105. The trace listener 160 may configure one or more trace points for data collection in the host subsystem 110 (e.g., in one or more layers of the operating system 125) during diagnostic testing. In some cases, the diagnostic executable may collect data (e.g., log data) directly from the memory subsystem 115, or from a buffer of the host subsystem (e.g., data associated with one or more events). The gateway 165 may be operable to connect with the cloud server 170 following diagnostic testing for data post-processing.

In some examples, the diagnostic tool may perform diagnostic testing on the system 105 to evaluate one or more metrics of system performance of the system 105. For example, the diagnostic tool may be configured to evaluate the system 105 based on software performance (e.g., associated with the host subsystem 110), hardware performance (e.g., associated with the memory subsystem 115), health of the system 105, or any combination therein. The diagnostic tool may track one or more events (e.g., application events) or tasks (e.g., associated with access operations) across layers of the operating system 125 to generate metrics related to host subsystem 110 performance (e.g., related to application efficiency, system resource allocation, or performance speed) or memory subsystem 115 performance (e.g., related to latency between operations or access operation efficiency).

In some examples, the system 105 (e.g., a loader application of the system 105) may initialize the diagnostic tool and diagnostic testing of the system 105 may begin. For example, the diagnostic tool may be initialized based on coupling (e.g., connecting, hot-plugging) the memory device 145 to the system 105 via a bus 140 (e.g., a USB, a hot-pluggable bus), where the system 105 is configured to monitor for the coupling, and may initiate the diagnostic tool based on detecting the memory device 145. The system 105 may retrieve the diagnostic executable from the memory device 145. In other examples, the system 105 may initiate the diagnostic tool based on a command. For example, the host subsystem 110 or a user may transmit a command to retrieve the diagnostic executable 150) from the memory device 145 and initiate the diagnostic testing, and, in response, the system 105 may retrieve the diagnostic executable 150 and begin testing. In some cases, the system 105 may configure diagnostic testing for different attributes of the system 105 at initialization. For example, a command transmitted by the system 105 include one or more indicators of system attributes to monitor, and the diagnostic tool may be configured to generate one or more metrics of system performance (e.g., related to software performance, related to hardware performance, related to system health) based on such attributes. Alternatively, system attributes to monitor may be preconfigured (e.g., prior to testing, in accordance with a user input). In some examples, diagnostic tool configuration may be further dependent on security of the system 105 and availability of dependencies of the system 105.

In some cases, initializing the diagnostic tool includes linking one or more dependencies (e.g., libraries, user libraries, packages) for the diagnostic executable 150. For example, the diagnostic executable may include the one or more dependencies (e.g., stored to the memory device 145), which may be linked based on the operating system 125 (e.g., based on one or more dependencies contained therein) upon retrieval. The diagnostic executable may determine which of the one or more dependencies to link based on an evaluation of the operating system 125, where the diagnostic executable may link one or more dependencies such that the diagnostic executable is compatible with the system 105 (e.g., with a configuration of the operating system 125).

In some examples, the diagnostic tool may be configured to generate one or more metrics related to software or hardware performance. For example, the diagnostic tool may generate one or more metrics associated with an event (e.g., an application event) across different layers of the operating system 125 or related to tasks for access operations associated with the layers of the operating system 125. The trace listener 160 may configure trace points in layers of the operating system 125 (e.g., at locations in the layers) in accordance with the one or more linked dependencies of the diagnostic executable 150. Accordingly, the trace points may be in locations compatible to the operating system 125 (e.g., for tracking an event of the host subsystem 110, for tracking tasks for an access operation). The host subsystem 110 may collect first data 135 (e.g., raw data) at the trace points and associated with tracking the event, and may store (e.g., continuously store) the first data to the buffer 130. The first data may include a first quantity of bits.

In some examples, the diagnostic tool may be configured to generate metrics related to the health of the system 105 (e.g., to the host subsystem 110, to the memory subsystem 115). In such examples, diagnostic executable 150 may configure a driver (e.g., a universal flash storage (UFS) driver) of the host subsystem 110 to collect third data 136 (e.g., raw data) from one or more monitored points of the memory subsystem 115, where the third data 136 may be related to an tracked event. In some examples, the third data 136 may include a health indication of the memory subsystem 115, in which, for example, the health indication may denote a quantity of access cycles of the memory subsystem 115 that have been performed by the system 105. The driver may store third data 136 to the buffer 130.

In some examples, the trace listener 160 may retrieve the first data 135 and the third data 136 from the buffer 130. For example, the trace listener 160 may be operable to continuously retrieve (e.g., as it is stored) the first data 135 and the third data 136. In such examples, the diagnostic executable 150 (e.g., the trace listener 160) may generate second data 155 from either or both of the first data 135 and the third data 136, where the diagnostic executable 150 may generate second data 155 by performing one or more processing (e.g., pre-processing) operations on the first data 135 and the third data 136. In some examples, the second data 155 may be generated from first data 135 and third data 136 related to a same event of the system 105. The second data 155 may include a second quantity of bits, where the second quantity of bits is less than the first quantity of bits associated with the first data 135.

In such examples, the second data 155 may include one or more metrics of performance of the system 105. In some cases, the second data 155 may include one or more metrics related to memory subsystem 115 access operation performance. Additionally or alternatively, the second data 155 may include one or more metrics related to the health of the system 105. The diagnostic executable 150 may store the second data 155 to the memory device 145. Because the second data 155 includes fewer bits than the first data 135, the third data 136, or the first data 135 and the second data 136 combined, performing processing operations and subsequently storing data to the memory device 145 may be more efficient as the stored data occupies less storage space of the memory device 145.

In some examples, following diagnostic testing, the memory device 145 may be returned to a processing center (e.g., test site) and post-processing operations on the second data 155 may occur. For example, the memory device 145 may be coupled to a device (not shown) at the processing center. The trace listener 160 may output the second data 155 to the device, and the gateway 165 may connect (e.g., via a wired or wireless connection) to the cloud server 170. The second data 155 may be stored to (e.g., synced to) the cloud server 170, and one or more post-processing operations may occur. For example, post-processing operations may be performed on the second data 155 to further evaluate the system 105 (e.g., associated with the tracked event, associated with access operations performed by the memory subsystem 115).

As the diagnostic tool is operable to link dependencies based on and associated with the system 105, the diagnostic executable 150 may have multi-platform compatibility (e.g., may perform diagnostic testing on systems utilizing different operating systems and different versions of an operating system). Additionally, because raw data (e.g., first data 135, third data 136) is processed prior to external storage, the diagnostic tool may reduce storage space (e.g., of the memory device 145, of the system 105) utilized to perform diagnostic testing. Accordingly, the diagnostic tool may be adaptable, efficient, and less invasive.

FIG. 2 illustrates an example of a diagnostic testing environment 200 that supports host system diagnostic testing in accordance with examples as disclosed herein. The diagnostic testing environment 200 may be an example of the diagnostic testing environment 100 as described with reference to FIG. 1. The diagnostic environment may include a system 205, a memory device 265, and a cloud server 270, where the system 205 includes a host subsystem 210 and a memory subsystem 215. In some examples, diagnostic testing (e.g., field-deployed diagnostic testing) may be performed on the system 205 to determine one or more metrics of performance for the system 205.

In some examples, the host subsystem 210 may include one or more layers associated with an operating system. For example, the host subsystem 210 may include a kernel 225 (e.g., associated with an operating system) including a file system layer 230, a block layer 235, and a driver layer 240. The kernel 225 may perform resource allocation and file management, among other operations, of the host subsystem 210. In such examples, layers of the kernel 225 may serve as an interface (e.g., as intermediate layers) between an application layer 220 (e.g., associated with the operating system) and hardware components of the system 205, where the file system layer 230 may be associated with (e.g., include) dependencies (e.g., libraries, user libraries, packages) of the host subsystem 210, the block layer 235 may manage memory (e.g., caches, buffers, peripheral memory) of the host subsystem 210, and the driver layer 240 may be operable to interact with (e.g., control) drivers of the host subsystem 210. Additionally or alternatively, the application layer 220 may interact directly with applications (e.g., associated with events and tasks of the system 205) of the host subsystem 210. In some examples, the memory device may include a buffer 245 (e.g., RAM) operable as storage (e.g., temporary storage of the host subsystem 210).

In some examples, on boot of the system 205 (e.g., as part of a start-up procedure) the host subsystem 210 may retrieve (e.g., load) a module 250 (e.g., stored to the memory subsystem 215). The module 250 may include a loader 285 and a verification module 287, and, in such examples, the module 250) may be stored to the buffer 245. The loader 285 may be initialized on boot (e.g., upon retrieval of the module 250), and may be operable to monitor for and initialize a diagnostic tool (e.g., a field-deployed diagnostic tool) for the system 205. The verification module 287 may be associated with a security protocol of the host subsystem 210, and may verify a diagnostic tool prior to executing. The loader 285 (e.g., and verification module 287) may be an example of the loader 122 of FIG. 1.

In some examples, the memory device 265 may be coupled to the system 205 via a bus 260 (e.g., a hot-pluggable bus, USB), and the loader 285 may identify the coupling. In such examples, the system 205 may retrieve (e.g., read, load) a module 255 (e.g., a diagnostic executable) from the memory device 265, which may be stored to the buffer 245. The module 255 may include a gateway 290 and a trace listener 292. The trace listener 292 may be operable to configure trace points in the host subsystem 210 and retrieve data associated with the trace points during diagnostic testing. The gateway 290 may be operable to connect the module 255 to the cloud server 170 (e.g., after diagnostic testing) to sync data (e.g., logs) collected and processed during diagnostic testing to the cloud server 170.

In such examples, after retrieving the module 250, the verification module 287 may verify the module 250 in accordance with one or more security protocols. If the module 255 is verified, the trace listener 292 may identify available dependencies of the host subsystem 210 (e.g., associated with the file system layer 230), and link one or more dependencies included in the trace listener 292 accordingly. Such linking may make the trace listener 292 compatible with the system 205 (e.g., in accordance with an operating system of the host subsystem 210) for diagnostic testing. In some cases, at initialization, the loader 285 may indicate one or more attributes of the system 205 (e.g., associated with an event, associated with a task) to the trace listener 292 for diagnostic testing. In such cases, the trace listener 292 may configure trace points 275 in accordance with indicated system attributes. For example, the trace listener 292 may be configured to collect data associated with (e.g., to generate) one or more metrics of performance of the system 205 with respect to an event across different layers or with respect to a task including access operations of the memory subsystem 215.

The trace listener 292 may configure at least two trace points 275 in layers of the host subsystem 210. For example, the trace listener 292 may configure a trace point 275-a at a location in the file system layer 230, a trace point 275-b in the block layer 235, and a trace point 275-c in the driver layer 240. In some examples, the trace listener 292 may be further operable to configure trace points 275 in the application layer 220. Although one trace point 275 is depicted in each layer of the kernel 225, the trace listener may configure fewer or more trace points 275 in each layer of the host subsystem 210. The host subsystem 210 may collect first data 280 (e.g., raw data, data samples) at each of the trace points 275, and may store the first data 280 (e.g., continuously store) the first data 280 to the buffer 245. In some cases, the first data 280 may include a first quantity of bits, and may be associated with an event or task of the system 205. For example, as first data 280 is collected at trace points 275 in different layers of the host subsystem 210, the first data 280 may track (or otherwise log information relevant to) an event or task across layers of the host subsystem 210. In some examples, portions of the first data 280 may come from data in a buffer of the host subsystem 210 associated with the event or task.

In some examples, the trace listener 292 may configure a driver (e.g., a UFS driver; not shown) of the host subsystem 210 to collect third data 282 from one or more monitored points of the memory subsystem 215, where the third data 282 may include a health indication of the memory subsystem 115. For example, the third data 282 may denote a quantity of access cycles of the memory subsystem 215 that have been performed by the system 205. The driver may store the third data 282 to the buffer 245.

In such examples, the trace listener 292 may retrieve the first data 280 and the third data 282 from the buffer 245 and generate second data 297. For example, the trace listener 292 may perform processing operation on the first data 280 and the third data 282 to generate (e.g., continuously generate) the second data 297. The second data 297 may include a second quantity of bits that is less than the first quantity of bits, and may include one or more metrics of performance of the system 205 related to an event tracked across layers of the host subsystem 210 or related to a task including access operations for the memory subsystem 215 (e.g., in accordance with the one or more indicated system attributes, in accordance with a configuration of the trace listener 292, in accordance with a configuration of the system 205). The trace listener 292 may store (e.g., continuously store) the second data 297 to the memory device 265.

In some examples, after diagnostic testing (e.g., after field testing the system 205) the memory device 265 may be coupled to a device (not shown) at a processing center (e.g., test site) and post-processing operations on the second data 297 may occur. For example, the gateway 290 may detect a wireless connection, and load (e.g., sync) the second data 297 to the cloud server 270, and the second data 297 may be utilized to evaluate the system 205, where such evaluations may include further processing of the second data 297.

As the trace listener 292 is configured to be compatible with different system platforms (e.g., different operating systems, different versions of an operating system), the diagnostic tool associated with the module 255 may be adaptable to different types of systems. Additionally, by performing processing operations on raw data during diagnostic testing, the diagnostic tool may have increased storage efficiency (e.g., allowing for field testing).

FIG. 3 illustrates an example of a process flow 300 that supports host system diagnostic testing in accordance with examples as disclosed herein. Aspects of the process flow 300 may be implemented by a system 105 or a system 205 as described with reference to FIGS. 1 and 2, respectively. The process flow 300 may depict a process for initializing and perform diagnostic testing (e.g., field testing) in accordance with a diagnostic tool stored to external memory. Such diagnostic testing may have multi-platform compatibility and may utilize efficient data storage techniques, thus enabling adaptable field testing.

In some cases, one or more aspects of the process flow 300 may be implemented by a controller (e.g., among other components), of the system. Additionally or alternatively, aspects of the process flow 300 may be implemented as instructions stored in the system (e.g., retrieved from external memory), or by circuitry of the system. For example, the instructions, if executed by a controller, may cause the system to perform one or more of the operations of the process flow 300. Alternative examples of the process flow 300 may be implemented in which some operations are performed in a different order than described, or not performed at all. In some cases, operations may include features not mentioned below, or additional operations may be added.

At 305, the system may initialize. For example, the system may transition from a first power state (e.g., an 'OFF' state) to a second power state (e.g., an 'ON' state), and the system may perform a boot procedure.

At 310, the system may wake-up a loader. For example, the system may wake-up (e.g., initialize) the loader as part of the boot procedure. In such examples, the loader may be configured to detect (e.g., identify) a tracer storage event associated with a diagnostic tool (e.g., a field deployed diagnostic tool) stored to external memory, where the loader may detect a coupling between the system and an external memory device via a bus (e.g., a hot-pluggable bus, a USB).

At 315, the loader may determine if there is a tracer storage event. For example, the loader may determine whether a tracer stored to the external memory device is available for retrieval based on a coupling between the system and the external memory device.

At 320, if the loader detected the tracer storage event at 315, the loader may determine if the external memory device includes one or more keys (e.g., security keys) associated with the tracer. For example, the external device may include one or more security keys to verify the tracer in accordance with a security protocol of the system.

At 325, if the loader did not detect keys on the external memory device at 320, the loader may determine if a security bypass is allowed. For example, the system may be configured to bypass one or more operations associated with a security protocol of the system for the external device (e.g., in accordance with a user override).

At 330, if the loader did not detect the tracer storage event at 315 or if the loader determined a security bypass is not allowed at 325, the loader may return to sleep mode. For example, the loader may return to sleep mode and diagnostic testing may not occur.

At 335, if the loader detected one or more keys on the external memory device at 320, the system (e.g., a verification module of the system) may verify the tracer. For example, the verification module may perform a verification procedure including one or more verification operations using the keys stored to external memory device and in accordance with a security protocol of the system.

At 340, the verification module may determine if the tracer passed the verification procedure. For example, the verification module may determine whether the tracer is allowed access to the system or is denied such access. If the tracer did not pass the verification procedure, the loader may return to sleep mode at 330, and diagnostic testing may not occur.

At 345, if the verification module determined that the tracer passed the verification procedure at 340 or if the system determined a security bypass is allowed at 325, the system may assign a privilege to the tracer. For example, the system may assign a user privilege (e.g., a super-user privilege) to the tracer, where the user privilege may enable the tracer to access the system. In such examples, the user privilege may allow the tracer to perform diagnostic testing on the system.

At 350, the loader may read the list of listener applications and associated dependencies (e.g., libraries, user libraries) stored at the external memory device (e.g., and associated with the tracer). For example, the loader may read the list of listener applications and associated dependencies as part of a procedure to determine compatibility between the diagnostic tool and the system.

At 355, the loader may identify available dependencies (e.g., libraries, user libraries, packages) stored to the system, where such dependencies may be associated with an operating system of the system (e.g., a version of an operating system). For example, the loader may identify the available dependencies as part of a procedure to determine compatibility between the diagnostic tool and the system.

At 360, the loader may determine whether all dependencies of the system are met. For example, the loader may determine whether each dependency of the system has a respective match of dependencies stored to the external memory device and associated with the tracer. If all dependencies of the set are met, the tracer may be compatible with the system for diagnostic testing. Alternatively, if all of the dependencies are not met, the tracer may not be compatible with the system and the loader may return to sleep mode at 530. In such cases, the diagnostic testing may not occur.

At 365, if the loader determined that all dependencies of the system are met at 360, the loader may load (e.g., retrieve, read) the tracer. For example, the loader may load the tracer from the external memory device, where the tracer may be stored to memory (e.g., a buffer) of the system.

At 370, the loader may activate the tracer. For example, the loader may activate the tracer by transmitting a command to the tracer, where the command may include one or more indications of system attributes. Following activation (e.g., initialization), the tracer may perform diagnostic testing on the system in accordance with the system attributes (e.g., as described with reference to FIGS. 1 and 2), in which, for example, the tracer may generate data (e.g., second data, processed data) indicating one or more metrics of system performance based on the system attributes during diagnostic testing.

At 375, the tracer may determine whether there is wireless connectivity available. For example, the tracer may determine, after performing diagnostic testing, whether the system or other connected device has wireless connectivity.

At 380, if the tracer did not determine there is wireless connectivity at 375, the tracer may store data (e.g., second data, processed data) locally. For example, the tracer may store the data to the external memory device. Alternatively, the tracer may store the data at the system (e.g., in a memory subsystem of the system).

At 385, if the tracer did determine there is wireless connectivity at 375, the tracer may activate the gateway (e.g., based on a command from the system). For example, the tracer may activate the gateway to establish a wireless connection with a cloud server, and the tracer may sync the data to the cloud server. In such examples, one or more post-processing operations may be performed on the data after syncing the data to the cloud server (e.g., at an external site).

Accordingly, the data may be accessed (e.g., from the cloud server, from the external memory device) to evaluate the system (e.g., evaluate the one or more indicated system attributes). The diagnostic tool may have multi-platform compatibility, and may have increased storage efficiency.

Figure 4:
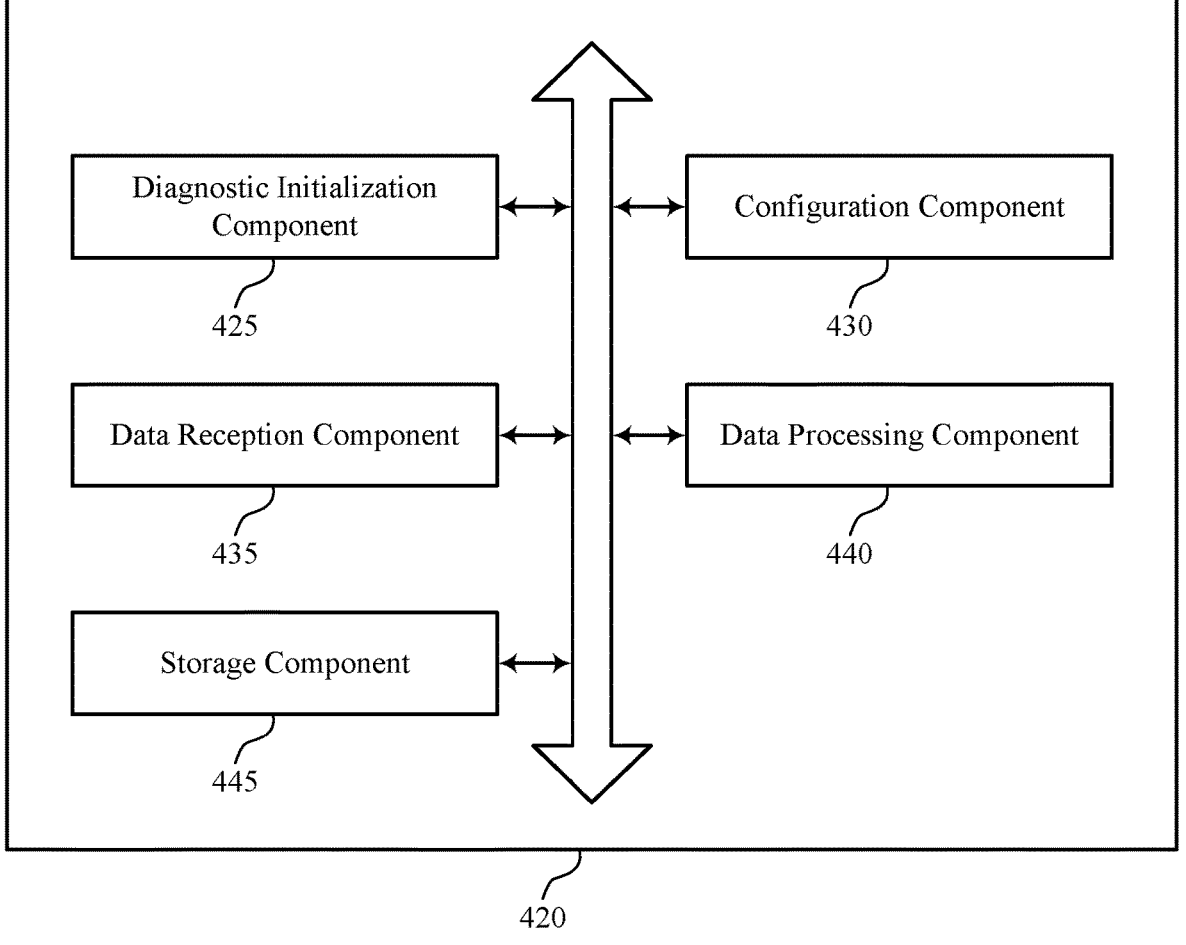
FIG. 4 shows a block diagram of a system that supports host system diagnostic testing in accordance with examples as disclosed herein.
Figure 4:

FIG. 4 shows a block diagram 400 of a system 420 that supports host system diagnostic testing in accordance with examples as disclosed herein. The system 420 may be an example of aspects of a system as described with reference to FIGS. 1 through 3. The system 420, or various components thereof, may be an example of means for performing various aspects of host system diagnostic testing as described herein. For example, the system 420 may include a diagnostic initialization component 425, a configuration component 430, a data reception component 435, a data processing component 440, a storage component 445, or any combination thereof. Each of these components may communicate, directly or indirectly, with one another (e.g., via one or more buses).

The diagnostic initialization component 425 may be configured as or otherwise support a means for initializing a diagnostic tool for a system including a host subsystem having a plurality of software layers, where initializing the diagnostic tool includes linking one or more dependencies for a diagnostic executable, and where the diagnostic executable and the one or more dependencies are stored on a memory device external to the system. The configuration component 430 may be configured as or otherwise support a means for configuring, by the diagnostic executable, a plurality of trace points in the host subsystem, where at least two trace points of the plurality of trace points are in different layers of the plurality of software layers of the system. The data reception component 435 may be configured as or otherwise support a means for receiving, by the diagnostic executable, first data collected at the at least two trace points, where the first data includes information related to an event across the different layers. In some examples, portions of the first data may also be retrieved from a buffer of the system, where the buffer is associated with the event. The data processing component 440 may be configured as or otherwise support a means for generating, by the diagnostic executable, second data based at least in part on performing one or more processing operations on the first data, where the second data includes one or more metrics of performance of the system for the event across the different layers. The storage component 445 may be configured as or otherwise support a means for storing the second data to the memory device.

In some examples, to support receiving the first data, the data reception component 435 may be configured as or otherwise support a means for reading, by the diagnostic executable, the first data from the buffer.

In some examples, the configuration component 430 may be configured as or otherwise support a means for configuring, by the diagnostic executable, a driver of the host subsystem to collect third data from one or more monitored points of a memory subsystem of the system. In some examples, the data reception component 435 may be configured as or otherwise support a means for receiving, by the diagnostic executable, the third data from the driver.

In some examples, the data processing component 440 may be configured as or otherwise support a means for performing, by the diagnostic executable, one or more processing operations on the third data, where generating the second data is based at least in part on performing one or more processing operations on the third data.

In some examples, to support performing the one or more processing operations, the data processing component 440 may be configured as or otherwise support a means for processing the first data related to the event and the third data related to the event.

In some examples, the third data includes an indication of a health condition of the memory subsystem.

In some examples, the health condition includes a quantity of access cycles of the memory subsystem that have been performed by the system.

In some examples, to support initializing the diagnostic tool, the diagnostic initialization component 425 may be configured as or otherwise support a means for receiving, from the host subsystem, a command to initialize the diagnostic executable, where the command includes one or more indicators of system attributes to monitor using the diagnostic executable.

In some examples, configuring the plurality of trace points is based at least in part on the one or more indicators of system attributes.

In some examples, to support initializing the diagnostic tool, the diagnostic initialization component 425 may be configured as or otherwise support a means for coupling the memory device to the system via a bus.

In some examples, the first data contains a first quantity of bits and the second data contains a second quantity of bits that is less than the first quantity of bits.

FIG. 5 shows a flowchart illustrating a method 500 that supports host system diagnostic testing in accordance with examples as disclosed herein. The operations of method 500 may be implemented by a system or its components as described herein. For example, the operations of method 500 may be performed by a system as described with reference to FIGS. 1 through 4. In some examples, a system may execute a set of instructions to control the functional elements of the device to perform the described functions. Additionally, or alternatively, the system may perform aspects of the described functions using special-purpose hardware.

At 505, the method may include initializing a diagnostic tool for a system including a host subsystem having a plurality of software layers, where initializing the diagnostic tool includes linking one or more dependencies for a diagnostic executable, and where the diagnostic executable and the one or more dependencies are stored on a memory device external to the system. The operations of 505 may be performed in accordance with examples as disclosed herein. In some examples, aspects of the operations of 505 may be performed by a diagnostic initialization component 425 as described with reference to FIG. 4.

At 510, the method may include configuring, by the diagnostic executable, a plurality of trace points in the host subsystem, where at least two trace points of the plurality of trace points are in different layers of the plurality of software layers of the system. The operations of 510 may be performed in accordance with examples as disclosed herein. In some examples, aspects of the operations of 510 may be performed by a configuration component 430 as described with reference to FIG. 4.

At 515, the method may include receiving, by the diagnostic executable, first data collected at the at least two trace points, where the first data includes information related to an event across the different layers. The operations of 515 may be performed in accordance with examples as disclosed herein. In some examples, aspects of the operations of 515 may be performed by a data reception component 435 as described with reference to FIG. 4.

At 520, the method may include generating, by the diagnostic executable, second data based at least in part on performing one or more processing operations on the first data, where the second data includes one or more metrics of performance of the system for the event across the different layers. The operations of 520 may be performed in accordance with examples as disclosed herein. In some examples, aspects of the operations of 520 may be performed by a data processing component 440 as described with reference to FIG. 4.

At 525, the method may include storing the second data to the memory device. The operations of 525 may be performed in accordance with examples as disclosed herein. In some examples, aspects of the operations of 525 may be performed by a storage component 445 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for initializing a diagnostic tool for a system including a host subsystem having a plurality of software layers, where initializing the diagnostic tool includes linking one or more dependencies for a diagnostic executable, and where the diagnostic executable and the one or more dependencies are stored on a memory device external to the system; configuring, by the diagnostic executable, a plurality of trace points in the host subsystem, where at least two trace points of the plurality of trace points are in different layers of the plurality of software layers of the system; receiving, by the diagnostic executable, first data collected at the at least two trace points, where the first data includes information related to an event across the different layers; generating, by the diagnostic executable, second data based at least in part on performing one or more processing operations on the first data, where the second data includes one or more metrics of performance of the system for the event across the different layers; and storing the second data to the memory device.

Aspect 2: The method, apparatus, or non-transitory computer-readable medium of aspect 1, where receiving the first data further includes operations, features, circuitry, logic, means, or instructions, or any combination thereof for reading, by the diagnostic executable, the first data from the buffer.

Aspect 3: The method, apparatus, or non-transitory computer-readable medium of any of aspects 1 through 2, further including operations, features, circuitry, logic, means, or instructions, or any combination thereof for configuring, by the diagnostic executable, a driver of the host subsystem to collect third data from one or more monitored points of a memory subsystem of the system and receiving, by the diagnostic executable, the third data from the driver.

Aspect 4: The method, apparatus, or non-transitory computer-readable medium of aspect 3, further including operations, features, circuitry, logic, means, or instructions, or any combination thereof for performing, by the diagnostic executable, one or more processing operations on the third data, where generating the second data is based at least in part on performing one or more processing operations on the third data.

Aspect 5: The method, apparatus, or non-transitory computer-readable medium of aspect 4, where performing the one or more processing operations includes operations, features, circuitry, logic, means, or instructions, or any combination thereof for processing the first data related to the event and the third data related to the event.

Aspect 6: The method, apparatus, or non-transitory computer-readable medium of any of aspects 3 through 5, where the third data includes an indication of a health condition of the memory subsystem.

Aspect 7: The method, apparatus, or non-transitory computer-readable medium of aspect 6, where the health condition includes a quantity of access cycles of the memory subsystem that have been performed by the system.

Aspect 8: The method, apparatus, or non-transitory computer-readable medium of any of aspects 1 through 7, where initializing the diagnostic tool further includes operations, features, circuitry, logic, means, or instructions, or any combination thereof for receiving, from the host subsystem, a command to initialize the diagnostic executable, where the command includes one or more indicators of system attributes to monitor using the diagnostic executable.

Aspect 9: The method, apparatus, or non-transitory computer-readable medium of aspect 8, where configuring the plurality of trace points is based at least in part on the one or more indicators of system attributes.

Aspect 10: The method, apparatus, or non-transitory computer-readable medium of any of aspects 1 through 9, where initializing the diagnostic tool further includes operations, features, circuitry, logic, means, or instructions, or any combination thereof for coupling the memory device to the system via a bus.

Aspect 11: The method, apparatus, or non-transitory computer-readable medium of any of aspects 1 through 10, where the first data contains a first quantity of bits and the second data contains a second quantity of bits that is less than the first quantity of bits.

Aspect 12: A method, apparatus, or non-transitory computer-readable medium including operations, features, circuitry, logic, means, or instructions, or any combination thereof for initializing a diagnostic tool for a system including a host subsystem and a memory subsystem, where initializing the diagnostic tool includes linking one or more dependencies for a diagnostic executable, and where the diagnostic executable and the one or more dependencies are stored on a memory device external to the system; configuring, by the diagnostic executable, a plurality of trace points in the host subsystem, where at least two trace points of the plurality of trace points are associated with different tasks for an access operation of the memory subsystem; receiving, by the diagnostic executable, first data collected at the at least two trace points, where the first data includes information related to the access operation across the different tasks; generating, by the diagnostic executable, second data based at least in part on performing one or more processing operations on the first data, where the second data includes one or more metrics of performance of the memory subsystem for the access operation; and storing the second data to the memory device.

Aspect 13: The method, apparatus, or non-transitory computer-readable medium of aspect 12, where receiving the first data further includes operations, features, circuitry, logic, means, or instructions, or any combination thereof for reading, by the diagnostic executable, the first data from the buffer.

Aspect 14: The method, apparatus, or non-transitory computer-readable medium of any of aspects 12 through 13, further including operations, features, circuitry, logic, means, or instructions, or any combination thereof for configuring, by the diagnostic executable, a driver of the host subsystem to collect third data from one or more monitored points of the memory subsystem and receiving, by the diagnostic executable, the third data for the access operation from the driver.

Aspect 15: The method, apparatus, or non-transitory computer-readable medium of aspect 14, further including operations, features, circuitry, logic, means, or instructions, or any combination thereof for performing, by the diagnostic executable, one or more processing operations on the third data, where generating the second data is based at least in part on performing the one or more processing operations on the third data.

Aspect 16: The method, apparatus, or non-transitory computer-readable medium of any of aspects 14 through 15, where the third data includes an indication of a health condition of the memory subsystem.

Aspect 17: The method, apparatus, or non-transitory computer-readable medium of aspect 16, where the health condition includes a quantity of access cycles of the memory subsystem that have been performed by the system.

Aspect 18: The method, apparatus, or non-transitory computer-readable medium of any of aspects 12 through 17, where initializing the diagnostic tool further includes operations, features, circuitry, logic, means, or instructions, or any combination thereof for receiving, from the host subsystem, a command to initialize the diagnostic executable, where the command includes one or more indicators of system attributes to monitor using the diagnostic executable.

Aspect 19: The method, apparatus, or non-transitory computer-readable medium of aspect 18, where configuring the plurality of trace points is based at least in part on the one or more indicators of system attributes.

Aspect 20: The method, apparatus, or non-transitory computer-readable medium of any of aspects 12 through 19, where initializing the diagnostic tool further includes operations, features, circuitry, logic, means, or instructions, or any combination thereof for coupling the memory device to the system via a bus.

Aspect 21: The method, apparatus, or non-transitory computer-readable medium of any of aspects 12 through 20, where the first data contains a first quantity of bits and the second data contains a second quantity of bits that is less than the first quantity of bits.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

initializing a diagnostic tool for a system comprising a host subsystem having a plurality of software layers, wherein a kernel for performing resource allocation and file management comprises more than one of the plurality of software layers, wherein initializing the diagnostic tool comprises linking one or more dependencies of an operating system for a diagnostic executable, wherein the one or more dependencies are of a plurality of dependencies that are applicable to a plurality of operating systems, and wherein the diagnostic executable and the one or more dependencies are stored on a memory device external to the system;

configuring, by the diagnostic executable, a plurality of trace points in the host subsystem, wherein at least two trace points of the plurality of trace points are in different layers of the plurality of software layers of the system;

receiving, by the diagnostic executable, first data collected at the at least two trace points, wherein the first data comprises information related to an event across the different layers;

generating, by the diagnostic executable, second data based at least in part on performing one or more processing operations on the first data, wherein the second data comprises one or more metrics of performance of the system for the event across the different layers; and storing the second data to the memory device.

2. The method of claim 1, wherein the host subsystem comprises a buffer, and wherein receiving the first data further comprises:

reading, by the diagnostic executable, the first data from the buffer.

3. The method of claim 1, further comprising:

configuring, by the diagnostic executable, a driver of the host subsystem to collect third data from one or more monitored points of a memory subsystem of the system; and receiving, by the diagnostic executable, the third data from the driver.

4. The method of claim 3, further comprising:

performing, by the diagnostic executable, one or more processing operations on the third data, wherein generating the second data is based at least in part on performing one or more processing operations on the third data.

5. The method of claim 4, wherein the event comprises an access operation of the memory subsystem, and wherein performing the one or more processing operations comprises:

processing the first data related to the event and the third data related to the event.

6. The method of claim 3, wherein the third data comprises an indication of a health condition of the memory subsystem, and wherein the health condition comprises a quantity of access cycles of the memory subsystem that have been performed by the system.

7. The method of claim 1, wherein initializing the diagnostic tool further comprises:

receiving, from the host subsystem, a command to initialize the diagnostic executable, wherein the command comprises one or more indicators of system attributes to monitor using the diagnostic executable, wherein configuring the plurality of trace points is based at least in part on the one or more indicators of system attributes.

8. The method of claim 1, wherein initializing the diagnostic tool further comprises:

coupling the memory device to the system via a bus.

9. The method of claim 1, wherein the first data contains a first quantity of bits and the second data contains a second quantity of bits that is less than the first quantity of bits.

10. A method, comprising:

initializing a diagnostic tool for a system comprising a host subsystem having a plurality of software layers and a memory subsystem, wherein a kernel for performing resource allocation and file management comprises more than one of the plurality of software layers, wherein initializing the diagnostic tool comprises linking one or more dependencies of an operating system for a diagnostic executable, wherein the one or more dependencies are of a plurality of dependencies that are applicable to a plurality of operating systems, and wherein the diagnostic executable and the one or more dependencies are stored on a memory device external to the system;

configuring, by the diagnostic executable, a plurality of trace points in the host subsystem, wherein at least two trace points of the plurality of trace points are associated with different tasks for an access operation of the memory subsystem;

receiving, by the diagnostic executable, first data collected at the at least two trace points, wherein the first data comprises information related to the access operation across the different tasks;

generating, by the diagnostic executable, second data based at least in part on performing one or more processing operations on the first data, wherein the second data comprises one or more metrics of performance of the memory subsystem for the access operation; and storing the second data to the memory device.

11. The method of claim 10, wherein the host subsystem comprises a buffer, and wherein receiving the first data further comprises:

reading, by the diagnostic executable, the first data from the buffer.

12. The method of claim 10, further comprising:

configuring, by the diagnostic executable, a driver of the host subsystem to collect third data from one or more monitored points of the memory subsystem; and receiving, by the diagnostic executable, the third data for the access operation from the driver.

13. The method of claim 12, further comprising:

performing, by the diagnostic executable, one or more processing operations on the third data, wherein generating the second data is based at least in part on performing the one or more processing operations on the third data.

14. The method of claim 12, wherein the third data comprises an indication of a health condition of the memory subsystem, and wherein the health condition comprises a quantity of access cycles of the memory subsystem that have been performed by the system.

15. The method of claim 10, wherein initializing the diagnostic tool further comprises:

receiving, from the host subsystem, a command to initialize the diagnostic executable, wherein the command comprises one or more indicators of system attributes to monitor using the diagnostic executable.

16. The method of claim 15, wherein configuring the plurality of trace points is based at least in part on the one or more indicators of system attributes.

17. The method of claim 10, wherein initializing the diagnostic tool further comprises:

coupling the memory device to the system via a bus.

18. The method of claim 10, wherein the first data contains a first quantity of bits and the second data contains a second quantity of bits that is less than the first quantity of bits.

19. A non-transitory computer-readable medium storing code, the code comprising instructions executable by a processor to:

initialize a diagnostic tool for a system comprising a host subsystem having a plurality of software layers, wherein a kernel for performing resource allocation and file management comprises more than one of the plurality of software layers, wherein initializing the diagnostic tool comprises linking one or more dependencies of an operating system for a diagnostic executable, wherein the one or more dependencies are of a plurality of dependencies that are applicable to a plurality of operating systems, and wherein the diagnostic executable and the one or more dependencies are stored on a memory device external to the system;

configure, by the diagnostic executable, a plurality of trace points in the host subsystem, wherein at least two trace points of the plurality of trace points are in different layers of the plurality of software layers of the system;

receive, by the diagnostic executable, first data collected at the at least two trace points, wherein the first data comprises information related to an event across the different layers;

generate, by the diagnostic executable, second data based at least in part on performing one or more processing operations on the first data, wherein the second data comprises one or more metrics of performance of the system for the event across the different layers; and store the second data to the memory device.

20. The non-transitory computer-readable medium of claim 19, wherein the instructions to receive the first data are further executable by the processor to:

read, by the diagnostic executable, the first data.

\* \* \* \* \*